US006778592B1

(12) United States Patent
Haga et al.

(10) Patent No.: US 6,778,592 B1
(45) Date of Patent: Aug. 17, 2004

(54) INTERFERENCE SIGNAL ELIMINATOR (75) Inventors: Hiroki Haga, Yokosuka (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,290

(22) PCT Filed: Mar. 3, 2000

(86) PCT No.: PCT/JP00/01253

§ 371 (c)(1),
(2), (4) Date: Oct. 30, 2000

(87) PCT Pub. No.: WO00/54446

PCT Pub. Date: Sep. 14, 2000

(30) Foreign Application Priority Data

Mar. 6, 1999 (JP) .......................................... 11-103047

(51) Int. Cl.⁷ .......................... H04B 15/00; H04K 1/00; H04L 27/30
(52) U.S. Cl. ....................................... 375/148; 375/144
(58) Field of Search ................................ 375/141–145, 375/147–153, 343; 370/342

(56) References Cited

U.S. PATENT DOCUMENTS

| | | | |
|---|---|---|---|
| 5,136,612 A | * 8/1992 | Bi | ............................... 370/342 |
| 5,687,190 A | 11/1997 | Tsao | |
| 5,956,333 A | 9/1999 | Zhou et al. | |
| 6,002,727 A | 12/1999 | Uesugi | |
| 6,088,383 A | 7/2000 | Suzuki et al. | |
| 6,111,868 A | 8/2000 | Lee et al. | |
| 6,141,373 A | * 10/2000 | Scott | .......................... 375/150 |
| 6,335,947 B1 | * 1/2002 | Lattard et al. | ............... 375/142 |

FOREIGN PATENT DOCUMENTS

| | | |
|---|---|---|
| EP | 0776105 | 5/1997 |
| JP | 6268630 | 9/1994 |
| JP | 7212274 | 8/1995 |
| JP | 9200179 | 7/1997 |
| JP | 10126383 | 5/1998 |
| JP | 11266184 | 9/1999 |
| WO | 97033401 | 9/1997 |
| WO | 9838805 | 9/1998 |

OTHER PUBLICATIONS

Patent Abstracts of Japan, vol. 1998, No. 09, Jul. 31, 1998 & JP10 098446 A (Korea Telecommun), Apr. 14, 1998.
Peter Jung et al., "Joint Detection with Coherent Receiver Antenna Diversity in CDMA Mobile Radio Systems," IEEE Transactions on Vehicular Technology, vol. 44, No. 1, Feb. 1995, pp. 76–88.
Anja Klein et al., "Zero Forcing and Minimum Mean–Square–Error Equalization for Multiuser Detection in Code–Division Multiple–Access Channels," IEEE Transactions on Vehicular Technology, vol. 45, No. 2, May 1996, pp. 276–287.

* cited by examiner

Primary Examiner—Phuong Phu
(74) Attorney, Agent, or Firm—Stevens, Davis, Miller & Mosher, LLP (57) ABSTRACT

Matched filters 102-1 to 102-n extract channel estimated values corresponding to users 1 to n by finding correlation with the reception signal. Threshold processing sections 103-1 to 103-n perform threshold processing on estimated power values obtained based on the channel estimated values corresponding to users 1 to n. JD section 104 performs matrix calculations using channel estimated values subjected to threshold processing. Multiplication section 105 performs a multiplication between the matrix calculation result and the reception signal. Identifier 106 performs hard decision on the multiplication result.

8 Claims, 6 Drawing Sheets

INTERFERENCE SIGNAL ELIMINATOR

TECHNICAL FIELD

The present invention relates to a CDMA (Code Division Multiple Access)-based communication apparatus, and more particularly, to an interference signal eliminator that eliminates interference using matrix calculations.

BACKGROUND ART

One of conventional methods for eliminating various interference such as interference due to multi-path fading, inter-symbol interference and multiple-access interference, and extracting a demodulated signal is an interference signal elimination method using Joint Detection (hereinafter referred to as "JD"). This JD is disclosed in "Zero Forcing and Minimum Mean-Square-Error Equalization for Multiuser Detection in Code-Division Multiple-Access Channels" (Klein A., Kaleh G. K., Baier P. W., IEEE Trans. Vehicular Technology, vol.45, pp.276–287, 1996).

An apparatus for implementing the conventional interference signal elimination method using JD will be explained using FIG. 1 and FIG. 2 below. In the following explanation, the number of users to be demodulated is assumed to be n.

Figure 1:
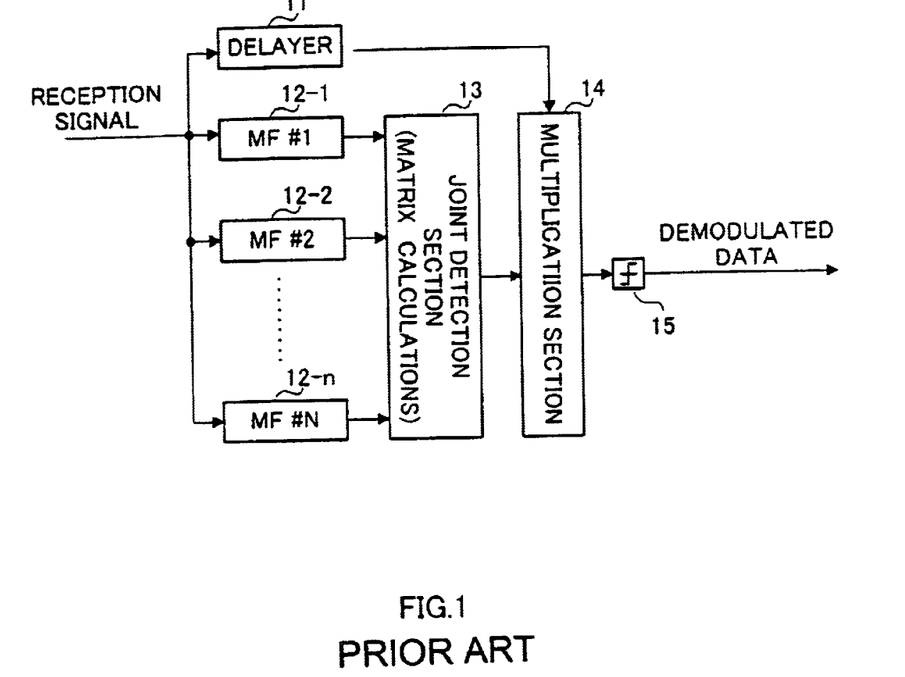
FIG. 1 is a block diagram showing a configuration of a conventional interference signal eliminator using JD.
Figure 2:
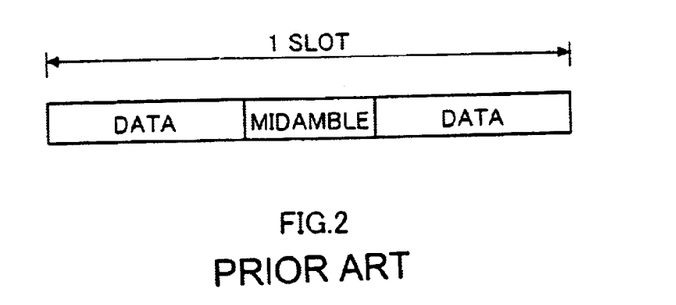
FIG. 2 is a schematic diagram showing a frame format used by the conventional interference signal eliminator using JD.

FIG. 1 is a block diagram showing a configuration of a conventional interference signal eliminator using JD. FIG. 2 is a schematic diagram showing a frame format used in the conventional interference signal eliminator using JD.

In FIG. 1, a reception signal is sent to delayer 11 and matched filters 12-1 to 12-n. Here, the reception signal above has been received by an antenna (not shown in the figure) and subjected to predetermined processing such as frequency conversion by a radio section (not shown in the figure). In delayer 11, the reception signal is delayed by a predetermined time and sent to multiplication section 14 which will be described later.

In matched filters 12-1 to 12-n, channel estimation is performed for each user using a midamble section (see FIG. 2) in a time slot of the reception signal. That is, in matched filters 12-1 to 12-n, a channel estimated value (matrix) for each user is obtained by finding a correlation between known midambles assigned to users 1 to n and the midamble section of the reception signal above within a maximum estimated delay range. Then, the channel estimated value for each of users 1 to n is sent from matched filters 12-1 to 12-n to Joint Detection (hereinafter referred to as "JD") section 13.

JD section 13 performs the following matrix calculations using the channel estimated value for each user above. That is, a convolution calculation is performed between the channel estimated value for each user and a spreading code assigned to each user and a convolution calculation result (matrix) for each user is thereby obtained.

In this way, a matrix made up of regularly placed convolution calculation results of their respective users (hereinafter referred to as "system matrix") is obtained. Here, for brevity of explanation, the system matrix is expressed as [A].

Furthermore, the following matrix is obtained by performing a matrix calculation shown in the following expression using the system matrix:

$$[B] = ([A]^H \cdot [A])^{-1} \cdot [A]^H \quad \text{(1)}$$

where, $[A]^H$ is a conjugate transposed matrix of the system matrix and $([A]^H \cdot [A])^{-1}$ is an inverse matrix of $[A]^H \cdot [A]$.

The matrix [B] obtained from the above matrix calculation is sent to multiplication section 14. In multiplication section 14, data for each user free of interference is obtained by carrying out multiplication processing between the data section (see FIG. 2) of the reception signal sent from delayer 11 and the matrix sent from JD section 13. The data for each user obtained at this time is sent to identifier 15. Identifier 15 performs hard decision on the data for each user sent from multiplication section 14 and demodulated data is obtained.

As shown above, the conventional interference signal eliminator using JD obtains demodulated data with interference eliminated without performing despreading or RAKE combining.

However, the conventional interference signal eliminator using JD has a problem of including not a little possibility that the accuracy of demodulated data will reduce for the reasons described below.

First, the channel estimated values obtained for respective users by matched filters 12-1 to 12-n have the potential for including errors, and therefore the matrix calculation results obtained by JD section 13 also have the potential for including errors. As a result, the accuracy of demodulated data obtained from multiplication section 14 may deteriorate.

Figure 3:
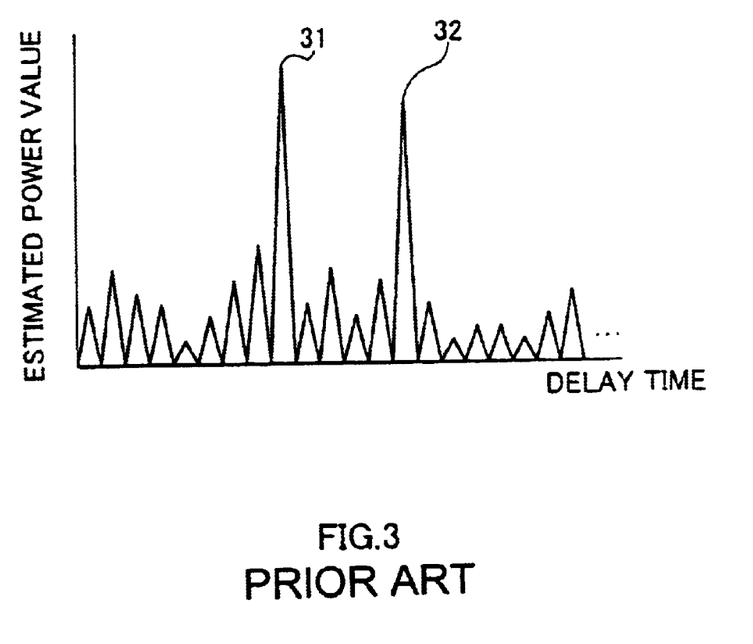
FIG. 3 is a schematic diagram showing a delay profile obtained by channel estimation by the conventional interference signal eliminator using JD.

Here, errors included in the channel estimated values will be explained with reference to FIG. 3. FIG. 3 is a schematic diagram showing a delay profile of a user obtained by channel estimation in the conventional interference signal eliminator using JD.

As shown in FIG. 3, from a channel estimated value estimated using a matched filter, a user's path and delay time of the path are obtained. That is, valid paths 31 and 32 with high estimated power are obtained and delay times of the valid paths are also obtained.

In this way, channel estimation is performed for each user. However, the channel estimation results sent to JD section 13 are not only the above mentioned valid paths but include other errors, and therefore the accuracy of the matrix calculation results obtained from JD section 13 deteriorates.

Secondly, in a CDMA- based communication, it is desirable to reduce transmit power of the apparatus on the transmitting side to a necessary minimum in order to suppress interference with other users. Therefore, when there is no data to be sent during a call, a method of sending only the midamble section in the aforementioned time slot (see FIG. 2) is adopted. This method is called "DTX."

In the case where a user (here, suppose user 2) only sends a midamble using DTX, since the conventional interference signal eliminator using JD receives the midamble section from user 2, it recognizes that the data section is also received from user 2. As a result, JD section 13 performs the aforementioned matrix calculations with the understanding that it is receiving the data section from user 2.

However, since user 2 is not sending the data section, the demodulated data resulting from a multiplication between the matrix calculation result from JD section 13 and reception signal includes an error. Moreover, trying to demodulate an originally non-existent signal of user 2 may cause an abnormal operation of the entire equipment.

As described above, the conventional interference signal eliminator using JD has a problem of including the potential for reducing the accuracy of demodulated data obtained.

DISCLOSURE OF INVENTION

The present invention has been implemented taking account of the problems described above and it is an object of the present invention to provide an interference signal eliminator capable of extracting demodulated data with high accuracy.

This object will be attained by applying threshold decision to an estimated power value calculated based on the channel estimated value obtained from the reception signal and applying the threshold decision result to matrix calculations.

BEST MODE FOR CARRYING OUT THE INVENTION

With reference now to the attached drawings, embodiments of the present invention will be explained in detail below.

Embodiment 1

Figure 4:
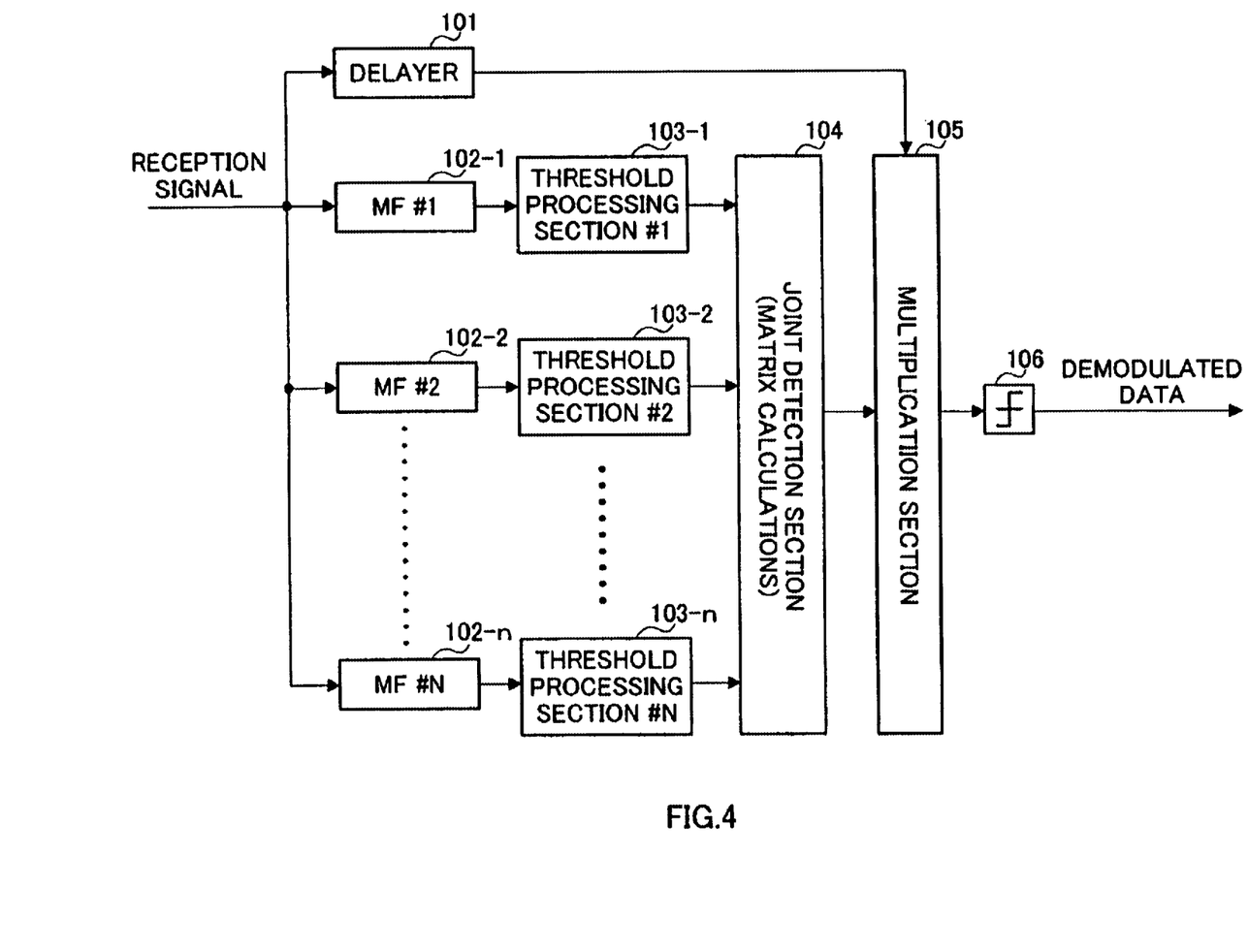
FIG. 4 is a block diagram showing a configuration of an interference signal eliminator according to Embodiment 1 of the present invention.

FIG. 4 is a block diagram showing a configuration of an interference signal eliminator according to Embodiment 1 of the present invention. In the following explanations, the number of users is assumed to be n.

In FIG. 4, delayer 101 sends a reception signal delayed by a predetermined time to multiplication section 105 which will be described later. Matched filters 102-1 to 102-n extract channel estimated values for their respective users 1 to n by finding a correlation using the reception signal and send the extracted channel estimated values to threshold processing sections 103-1 to 103-n.

Threshold processing sections 103-1 to 103-n perform threshold processing on estimated power obtained based on channel estimated values for their respective users 1 to n and send the threshold processing results to Joint Detection (hereinafter referred to as "JD") section 104. Details of the threshold processing of threshold processing sections 103-1 to 103-n will be given later.

JD section 104 performs matrix calculations using channel estimated values sent from threshold processing sections 103-1 to 103-n and sends the matrix calculation results to multiplication section 105. Multiplication section 105 multiplies the matrix calculation result from JD section 104 by the reception signal from delayer 101 and sends the multiplication result to identifier 106.

Identifier 106 performs hard decision on the multiplication result from multiplication section 105 and extracts demodulated data.

Then, the operation of the interference signal eliminator with the above configuration will be explained. The reception signal is the signal that is sent with the time slot shown in FIG. 2, received via an antenna (not shown in the figure) and subjected to predetermined processing such as frequency conversion by a reception section (not shown in the figure). The time slot shown in FIG. 2 is the same as that described above and therefore detailed explanations will be omitted.

First, the above reception signal is sent to delayer 101 and matched filters 102-1 to 102-n. At delayer 101, the reception signal is delayed by a predetermined time and sent to multiplication section 105.

Matched filters 102-1 to 102-n use the midamble section (see FIG. 1) in the time slot of the reception signal and perform channel estimation for each user. That is, matched filters 102-1 to 102-n find a correlation between known midamble assigned to users 1 to n and the midamble section in the above reception signal within a maximum estimated delay range and obtain a channel estimated value (matrix) for each user. Here, the above channel estimated value is expressed in a complex number made up of an I component and Q component.

Then, matched filters 102-1 to 102-n send the channel estimated values for users 1 to n to threshold processing sections 103-1 to 103-n, respectively.

Threshold processing sections 103-1 to 103-n performs threshold processing on estimated power obtained by applying power calculation on the channel estimated values of users 1 to n sent from their respective matched filters 102-1 to 102-n. Here, for brevity, the threshold processing of each threshold processing section will be explained below taking threshold processing 103-1 that handles a channel estimated value of user 1 as an example and with reference to FIG. 5 and FIG. 6.

Figure 5:
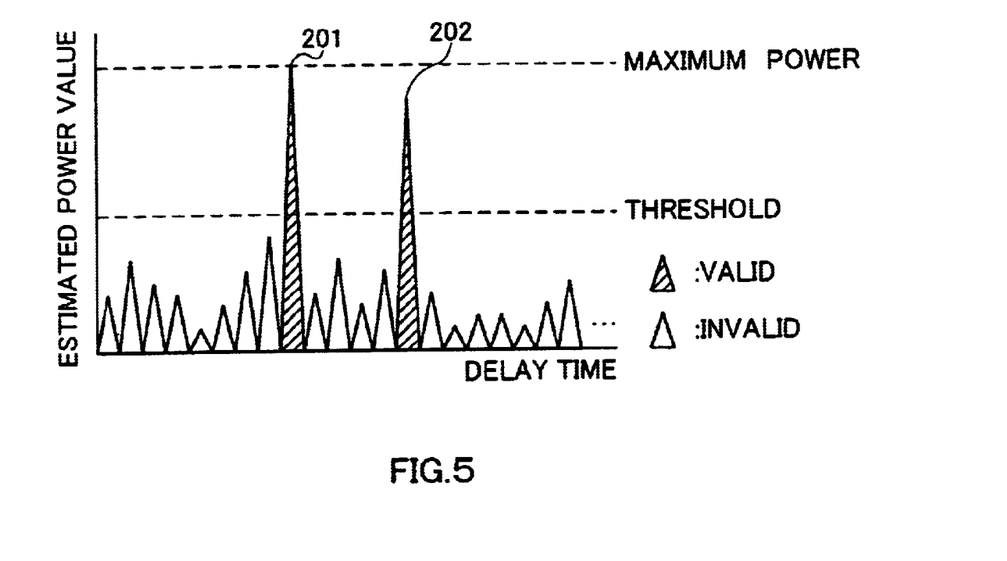
FIG. 5 is a schematic diagram showing a delay profile obtained by power calculation on a channel estimated value in the interference signal eliminator according to Embodiment 1.
Figure 6:
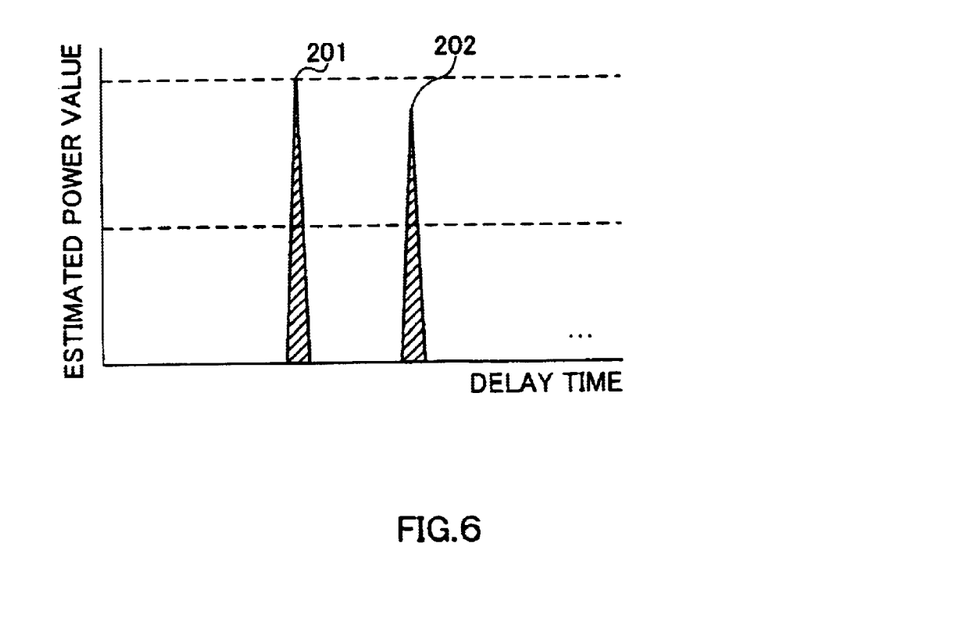
FIG. 6 is a schematic diagram showing a delay profile obtained by threshold processing in the interference signal eliminator according to Embodiment 1.

FIG. 5 is a schematic diagram showing a delay profile obtained by power calculation on a channel estimated value of matched filter 102-1 in the interference signal eliminator according to Embodiment 1 of the present invention. FIG. 6 is a schematic diagram showing a delay profile of user 1 obtained by threshold processing of threshold processing section 103-1 in the interference signal eliminator according to Embodiment 1 of the present invention.

FIG. 5 shows the magnitude of channel estimated power at intervals over time. Here, estimated power is calculated by power calculation on a channel estimated value, that is, by finding the sum of the squares of the I component and Q component of the channel estimated value.

First, of all estimated power values, power values whose magnitude is greater than a threshold are decided to be valid paths and power values whose magnitude is smaller than the threshold are decided to be invalid paths. As a result, path 201 and path 202 are decided to be valid paths, while the other estimated power values are decided to be invalid paths. Here, these invalid paths are paths of users other than user 1 or power of estimated values produced by various other factors. In this way, the only valid paths are path 201 and path 202 as shown in FIG. 6.

Then, in a channel estimated value, parts other than the valid paths (chip unit) are eliminated and the elimination result is sent to JD section 104 as channel estimated values after threshold processing of user 1.

The above threshold is set as follows. That is, an appropriate threshold is obtained based on the accuracy of demodulated data obtained through a plurality of demodulation processes and a threshold set each time. Thus, it is possible to set a value obtained by subtracting X [dB] from the maximum estimated power value as the optimal threshold.

Moreover, aside from the above method, it is also possible to extract a threshold with optimal accuracy of demodulated data from among thresholds obtained by a plurality of demodulation processes and set an average of this threshold as an optimal threshold. By the way, the threshold can be changed as appropriate not only by the method above but also according to various conditions such as the accuracy of the demodulated data and conditions of the transmission path.

Furthermore, it is also possible to increase/decrease the optimal threshold set above according to various conditions and use it as a new threshold. This is what the threshold processing is all about.

The channel estimated values after threshold processing by threshold processing sections 103-1 to 103-n are sent to JD section 104.

JD section 104 performs the following matrix calculations using the channel estimated value for each user. That is, by carrying out convolution calculation between the channel estimated value for each user and spreading code assigned to each user, a convolution calculation result (matrix) for each user is obtained.

From this, a matrix with the convolution calculation results of users regularly placed (hereinafter referred to as "system matrix") is obtained. For brevity of explanation, the system matrix is expressed as [A] here.

Moreover, by carrying out a matrix multiplication according to the above expression ①using the system matrix, a matrix [B] is obtained.

The matrix [B] obtained by the above matrix calculation is sent to multiplication section 105. Multiplication section 105 performs multiplication processing between the data section of the reception signal sent from delayer 101 (see FIG. 1) and a matrix sent from JD section 104 and in this way data for each user free of interference is obtained. The data for each user obtained at this time is sent to identifier 105. Identifier 105 performs hard decision on the data for each user sent from multiplication section 104 and thereby obtains demodulated data.

Then, the accuracy of demodulated data obtained from the interference signal eliminator of this embodiment will be explained with reference to FIG. 7.

Figure 7:
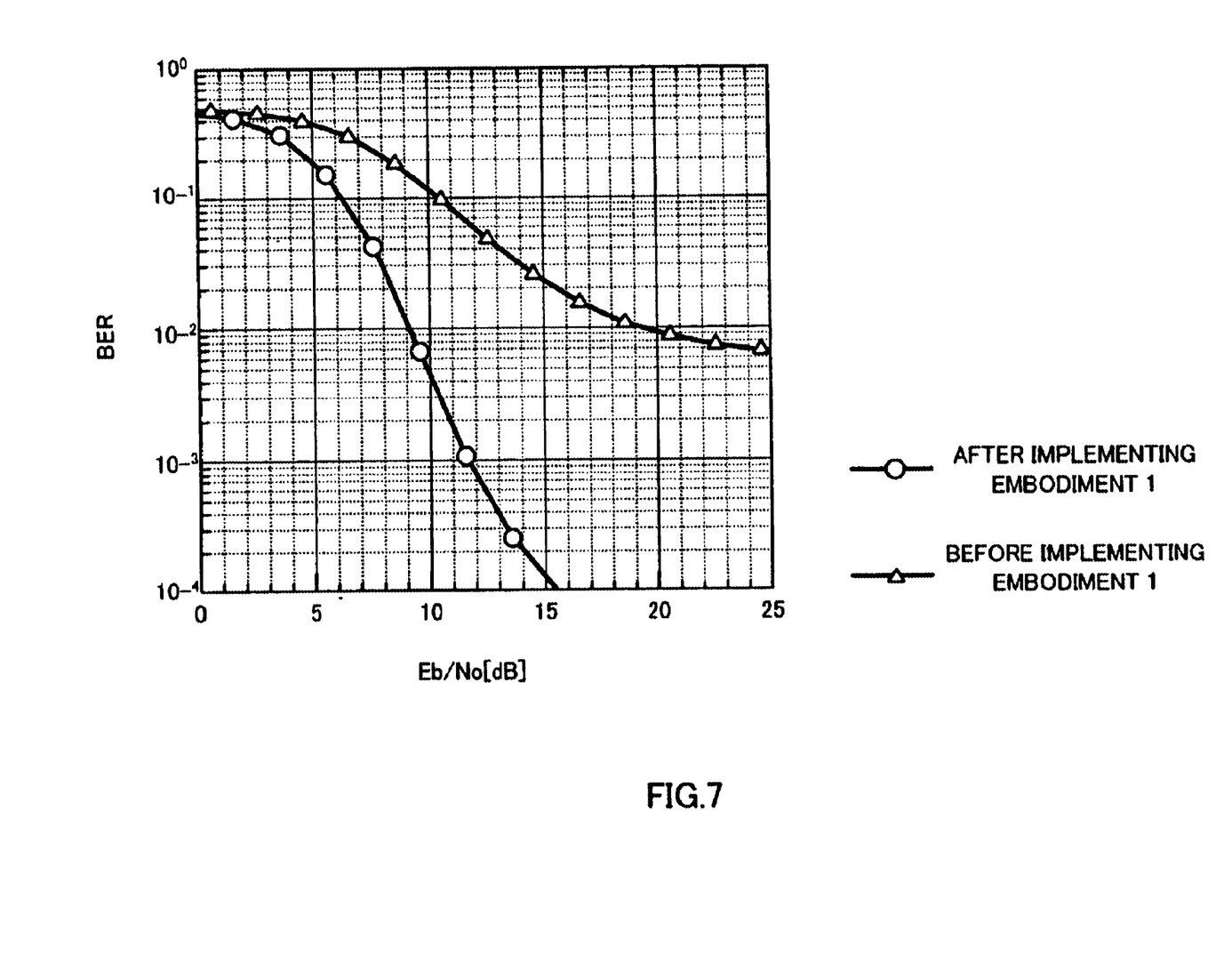
FIG. 7 is a graph showing the accuracy of demodulated data obtained by the interference signal eliminator according to Embodiment 1.

FIG. 7 is a graph that shows the accuracy of demodulated data obtained by the interference signal eliminator of this embodiment in comparison with the accuracy of the conventional apparatus.

FIG. 7 shows BER (bit error rate) of demodulated data versus the ratio of noise power density of the reception signal ("NO" in the figure) to average code energy per one bit of the reception signal ("Eb" in the figure) in both the interference signal eliminator of this embodiment and the conventional interference signal eliminator. In the figure, the ○ plots denote values measured by the interference signal eliminator of this embodiment and the Δ plots denote values measured by the conventional interference signal eliminator.

As is clear from the figure, this embodiment can suppress transmit power necessary to maintain BER of demodulated data at a certain level to a level lower than the conventional system. That is, the interference signal eliminator of this embodiment can not only improve the accuracy of demodulated data but also suppress transmit power at the apparatus on the transmitting side without influencing the accuracy of demodulated data. This can suppress interference with other users.

As shown above, this embodiment performs matrix calculation using the result of eliminating the part corresponding to invalid paths in channel estimated values and then extracts demodulated data using this matrix calculation result, and therefore can obtain high accuracy demodulated data. This embodiment can also reduce transmit power of the apparatus on the transmitting side, and therefore can suppress interference with other users.

Embodiment 2

Embodiment 2 is a mode that allows Embodiment 1 to handle signals sent using DTX. The interference signal eliminator according to this embodiment will be explained with reference to FIG. 8 below.

Figure 8:
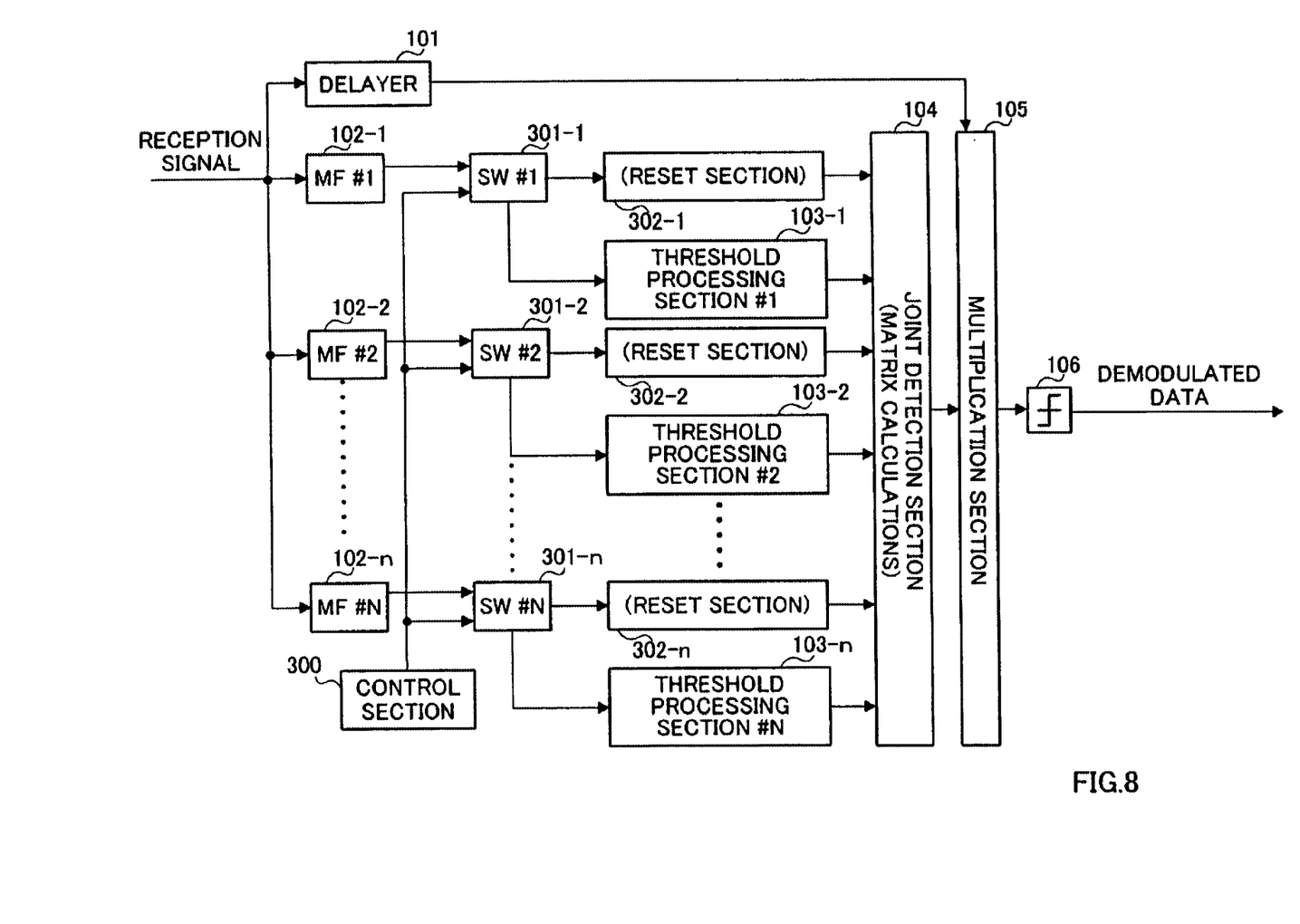
FIG. 8 is a block diagram showing a configuration of an interference signal eliminator according to Embodiment 2 of the present invention.

FIG. 8 is a block diagram showing a configuration of the interference signal eliminator according to Embodiment 2 of the present invention. The parts in FIG. 8 with the same configuration as that of Embodiment 1(FIG. 4) will be assigned the same reference numerals as those in FIG. 4 and their detailed explanations will be omitted. Regarding the interference signal eliminator according to Embodiment 2, only the parts different from those of Embodiment 1 will be explained below.

The apparatus on the transmitting side transmits a signal containing information on DTX to the interference signal eliminator according to this embodiment beforehand. That is, the apparatus on the transmitting side transmits a signal with information indicating whether DTX is used or not, in other words, information on whether only the midamble section is sent or the entire signal including the data section is sent, added to the midamble section of the above time slot (see FIG. 2).

As described above, the interference signal eliminator according to this embodiment receives the signal sent from the apparatus on the transmitting side.

In FIG. 8, the channel estimated values obtained by matched filters 102-1 to 102-n are sent to switches 301-1 to 301-n and control section 500 through paths, which are not shown in the figure.

Control section 500 uses the channel estimation results from matched filters 102-1 to 102-n to decide whether each signal is sent by each user using DTX or not. Furthermore, control section 500 sends signals about switching control to switches 301-1 to 301-n according to the above decision result.

That is, to those of switches 301-1 to 301-n whose corresponding user signal is sent using DTX, control section 500 sends a signal informing that a channel estimated value will be sent to the reset section, whereas to those switches whose corresponding user signal is sent without using DTX, control section 500 sends a signal informing that a channel estimated value will be sent to the threshold processing section as in the case of Embodiment 1.

Switches 301-1 to 301-n send the channel estimated values sent from the matched filters 102-1 to 102-n to reset sections 302-1 to 302-n or threshold processing sections 103-1 to 103-n according to the control signal from control section 500 above.

In reset sections 302-1 to 302-n, channel estimated values sent from switches 301-1 to 301-n are reset. The reset results are sent to JD section 104. This reset result is equivalent to the output result in this case where there are no users.

In JD section 104, the user signal sent using DTX is treated as a signal of a non-existent user and the above described matrix calculation is performed. As a result, high accuracy demodulated data is obtained from identifier 106.

Thus, this embodiment resets a channel estimated value corresponding to the user whose data section does not exist in the reception signal according to information on DTX contained in the midamble section in the reception signal, making it possible to perform accurate matrix calculations. This allows high accuracy demodulated data to be extracted.

The interference signal eliminator explained in the above embodiments can be mounted on a base station apparatus and radio communication terminal apparatus in a CDMA-based radio communication system.

As described above, the present invention can provide an interference signal eliminator capable of extracting demodulated data with high accuracy.

The interference signal eliminator of the present invention adopts a configuration comprising a matched filter calculation section that performs correlation processing between reception signals from a plurality of other ends of communication and a known signal and calculates a channel estimated value, a threshold decision section that performs threshold decision on an estimated power value obtained from the channel estimated value and a joint detection calculation section that performs a joint detection calculation on the threshold decision result and obtains demodulated data.

This configuration allows parts corresponding to invalid paths of the channel estimated value to be eliminated by comparing estimated power calculated based on the channel estimated value obtained from the reception signals with a threshold, making it possible to extract demodulated data with high accuracy.

The interference signal eliminator of the present invention adopts a configuration comprising an extraction section that extracts an identification signal indicating the presence/absence of data from a reception signal, with the threshold decision section resetting a channel estimated value corresponding to the other end of communication of which the identification signal indicates the absence of data and sending the channel estimated value to the joint detection calculation section.

This configuration allows accurate matrix calculation processing by resetting a channel estimated value corresponding to the other end of communication including no data section, making it possible to extract demodulated data with high accuracy and prevent abnormal operations of the apparatus.

The interference signal eliminator of the present invention adopts a configuration with the threshold decision section setting a channel estimated value corresponding to an estimated power value of less than a threshold to zero and only sending a channel estimated value corresponding to an estimated power value exceeding the threshold to the joint detection calculation section.

This configuration allows the parts corresponding to invalid paths in the channel estimated value to be removed and allows matrix calculations to be performed accurately. This makes it possible to extract demodulated data with high accuracy.

The interference signal eliminator of the present invention adopts a configuration with the matched filter calculation section performing matched filter calculations only for a predetermined period in consideration of a delay of the reception signal.

This configuration allows channel estimation taking into account each user's delay time in the reception signal, thus allowing channel estimated values more accurately. This also makes it possible to extract more accurate demodulated data.

The base station apparatus of the present invention comprises an interference signal eliminator and the interference signal eliminator adopts a configuration comprising a matched filter calculation section that performs correlation processing between reception signals from a plurality of other ends of communication and a known signal and calculates a channel estimated value, a threshold decision section that performs threshold decision on the estimated power value obtained from the channel estimated value and a joint detection calculation section that performs a joint detection calculation on the threshold decision result and obtains demodulated data.

The communication terminal apparatus of the present invention performs a radio communication with a base station equipped with an interference signal eliminator and the interference signal eliminator adopts a configuration comprising a matched filter calculation section that performs correlation processing between receptions signals from a plurality of other ends of communication and a known signal and calculates a channel estimated value, a threshold decision section that performs threshold decision on the estimated power value obtained from the channel estimated value and a joint detection calculation section that performs a joint detection calculation on the threshold decision result and obtains demodulated data.

These configurations incorporate an interference signal eliminator capable of extracting demodulated data with high accuracy, providing the base station apparatus and communication terminal apparatus that implement optimal communications.

The interference signal elimination method of the present invention comprises a matched filter calculation step that performs correlation processing between reception signals from a plurality of other ends of communication and a known signal and calculates a channel estimated value, a threshold decision step that performs threshold decision on the estimated power value obtained from the channel estimated value and a joint detection calculation step that performs a joint detection calculation on the threshold decision result and obtains demodulated data.

This method allows parts corresponding to invalid paths of the channel estimated value to be eliminated by comparing estimated power calculated based on the channel estimated value obtained from the reception signals with a threshold, making it possible to extract demodulated data with high accuracy.

The interference signal elimination method of the present invention comprises an extraction step that extracts an identification signal showing the presence/absence of data from a reception signal, with the threshold decision step resetting a channel estimated value corresponding to the other end of communication of which the identification signal indicates the absence of data and sending the channel estimated value to the joint detection calculation step.

This method allows accurate matrix calculation processing by resetting a channel estimated value corresponding to the other end of communication including no data section, making it possible to extract demodulated data with high accuracy and prevent abnormal operations of the apparatus.

This application is based on the Japanese Patent Application No.HEI 11-103047 filed on Mar. 6, 1999, entire content of which is expressly incorporated by reference herein.

Industrial Applicability

The present invention is ideally applicable to a field of CDMA (Code Division Multiple Access)-based communication apparatuses.

What is claimed is:

1. An interference signal eliminator comprising:

a matched filter calculation section that performs correlation processing between reception signals from a plurality of other ends of communication and a known signal and calculates a channel estimated value based on the correlation processing;

an extraction section that extracts an identification signal, indicating a presence or absence of data, from one of the reception signals;

a threshold decision section that performs a threshold decision process on an estimated power value obtained from the channel estimated value and that resets the channel estimated value corresponding to one of the other ends of communication of which the identification signal indicates the absence of data; and a joint detection calculation section that performs a joint detection calculation using a reset result and a threshold decision result of said threshold decision section.

2. The interference signal eliminator according to claim 1, wherein said joint detection calculation section performs said joint detection calculation on said estimated power value obtained from said channel estimated value.

3. The interference signal eliminator according to claim 1, wherein said threshold decision section sends said channel estimated value reset to said joint detection calculation section.

4. The interference signal eliminator according to claim 1, wherein the threshold decision section produces for the channel estimated value a value of zero when the estimated power value is less than a threshold value and produces and sends to said joint detection calculation section a value corresponding to the estimated power value when the estimated power value exceeds the threshold value.

5. The interference signal eliminator according to one of claims 1 and 3, wherein the matched filter calculation section performs matched filter calculations only for a predetermined period in accordance with a delay of said one reception signal.

6. A base station apparatus having an interference signal eliminator according to claim 1.

7. A communication terminal apparatus that performs radio communications with a base station apparatus having an interference signal eliminator according to claim 1.

8. An interference signal eliminating method comprising:

(a) performing a matched filter calculation step by correlation processing between reception signals from a plurality of other ends of communication and a known signal;

(b) calculating a channel estimated value based on the correlation processing;

(c) extracting an identification signal indicating a presence or absence of data from one of the reception signals;

(d) performing a threshold decision process on an estimated power value obtained from the channel estimated value and resetting the channel estimated value corresponding to one of the other ends of communication of which the identification signal indicates the absence of data;

(e) performing a joint detection calculation on the estimated power value obtained from the channel estimated value using the reset result and the threshold decision result of step (d); and (f) obtaining demodulated data using said joint detection calculation.

* * * * *